US012610207B2

(12) United States Patent
Yoo et al.

(10) Patent No.: US 12,610,207 B2
(45) Date of Patent: Apr. 21, 2026

(54) ACOUSTIC SIGNAL PROCESSING DEVICE FOR SPATIALLY EXTENDED SOUND SOURCE AND METHOD

(71) Applicant: Electronics and Telecommunications Research Institute, Daejeon (KR)

(72) Inventors: Jae-hyoun Yoo, Daejeon (KR); Kyeongok Kang, Daejeon (KR); Yong Ju Lee, Daejeon (KR); Dae Young Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 17/992,036

(22) Filed: Nov. 22, 2022

(65) Prior Publication Data

US 2023/0171559 A1 Jun. 1, 2023

(30) Foreign Application Priority Data

Nov. 26, 2021 (KR) ........................ 10-2021-0166017
Oct. 24, 2022 (KR) ........................ 10-2022-0137236

(51) Int. Cl.
*H04S 7/00* (2006.01)

(52) U.S. Cl.
CPC ........... *H04S 7/303* (2013.01); *H04S 2400/11* (2013.01)

(58) Field of Classification Search
CPC ...... H04S 7/303; H04S 2400/11; H04S 7/304; H04S 5/005; H04R 2499/15; G06T 17/00; G06F 3/16
See application file for complete search history.

(56) References Cited

U.S. PATENT DOCUMENTS

| | | | | |
|---|---|---|---|---|
| 8,639,498 | B2 | 1/2014 | Baek et al. | |
| 10,609,504 | B2 | 3/2020 | Park et al. | |
| 11,190,897 | B2 | 11/2021 | Norris et al. | |
| 11,252,523 | B2 | 2/2022 | Disch et al. | |
| 2008/0167880 | A1 | 7/2008 | Seo et al. | |
| 2017/0325045 | A1* | 11/2017 | Baek | H04S 1/002 |

(Continued)

FOREIGN PATENT DOCUMENTS

| | | |
|---|---|---|
| JP | 2017-175356 | 9/2017 |
| JP | 2018-19294 | 2/2018 |

(Continued)

*Primary Examiner* — Carolyn R Edwards
*Assistant Examiner* — Dylan Maguire Neece
(74) *Attorney, Agent, or Firm* — KILE PARK REED & HOUTTEMAN PLLC

(57) ABSTRACT

Provided is an acoustic signal processing device for a spatially extended sound source and a method thereof. The acoustic signal processing device includes a memory configured to store instructions, and a processor electrically connected to the memory and configured to execute the instructions. When the instructions are executed by the processor, the processor performs a plurality of operations, and the plurality of operations includes transforming an object provided as a spatially extended sound source into a cuboid in a virtual reality (VR) space, obtaining coordinates of the cuboid, and determining a position of a sound source of the object based on the coordinates of the cuboid and coordinates of a user in the VR space.

16 Claims, 11 Drawing Sheets

(56) References Cited

U.S. PATENT DOCUMENTS

| | | | | |
|---|---|---|---|---|
| 2018/0098173 | A1* | 4/2018 | Van Brandenburg | G10L 19/008 |
| 2018/0246698 | A1* | 8/2018 | Huang | G06F 3/04842 |
| 2021/0258712 | A1 | 8/2021 | Lyren et al. | |

FOREIGN PATENT DOCUMENTS

| | | | | |
|---|---|---|---|---|
| KR | 10-0626661 | | 9/2006 | |
| WO | WO-2013064914 | A1 * | 5/2013 | G06F 3/011 |
| WO | WO-2020127329 | A1 * | 6/2020 | H04S 7/303 |

* cited by examiner

ACOUSTIC SIGNAL PROCESSING DEVICE FOR SPATIALLY EXTENDED SOUND SOURCE AND METHOD

CROSS-REFERENCE TO RELATED APPLICATION

This application claims the benefit of Korean Patent Application No. 10-2021-0166017 filed on Nov. 26, 2021 and Korean Patent Application No. 10-2022-0137236 filed on Oct. 24, 2022, in the Korean Intellectual Property Office, the entire disclosure of which is incorporated herein by reference for all purposes.

BACKGROUND

1. Field of the Invention

One or more embodiments relate to an acoustic signal processing device for a spatially extended sound source and a method thereof.

2. Description of the Related Art

For a virtual reality (VR) environment, various types of acoustic signal processing methods may be used. For example, in the VR environment, various types of sound sources such as a point sound source, a line sound source, a surface sound source, and a volumetric sound source may exist.

A spatially extended sound source may refer to a sound source of which sound is output from a predetermined length, a predetermined area, and/or a predetermined volume. Various types of objects (e.g., a helicopter) may exist in the VR environment. The object existing in the VR environment may be the spatially extended sound source.

The above description has been possessed or acquired by the inventor(s) in the course of conceiving the present disclosure and is not necessarily an art publicly known before the present application is filed.

SUMMARY

An acoustic signal processing device according to an embodiment may provide a method of easily localizing a sound image by transforming an object having a complex shape into a cuboid.

The acoustic signal processing device according to an embodiment may reduce the amount of computation for acoustic signal processing by transforming an object having a complex shape into a cuboid.

However, the technical aspects are not limited to the aforementioned aspects, and other technical aspects may be present.

According to an aspect, there is provided an acoustic signal processing device including a memory configured to store instructions, and a processor electrically connected to the memory and configured to execute the instructions. When the instructions are executed by the processor, the processor may perform a plurality of operations, and the plurality of operations may include transforming an object provided as a spatially extended sound source into a cuboid in a virtual reality (VR) space, obtaining coordinates of the cuboid, and determining a position of a sound source of the object based on the coordinates of the cuboid and coordinates of a user in the VR space.

The transforming of the object may include obtaining a first maximum value and a first minimum value among x-coordinates of the object, obtaining a second maximum value and a second minimum value among y-coordinates of the object, obtaining a third maximum value and a third minimum value among z-coordinates of the object, and forming the cuboid by using the first maximum value, the first minimum value, the second maximum value, the second minimum value, the third maximum value, and the third minimum value.

The determining of the position of the sound source of the object may include calculating a length of a short side of the cuboid and a length of a long side of the cuboid by using the coordinates of the cuboid, and determining a position of a first channel of the sound source and a position of a second channel of the sound source based on one of the length of the short side and the length of the long side.

The determining of the position of the first channel and the position of the second channel may include calculating a second distance between the user and the first channel and a third distance between the user and the second channel, based on a first distance between a center of the cuboid and the user and the one of the length of the short side and the length of the long side, and determining the position of the first channel and the position of the second channel based on the second distance and the third distance.

The determining of the position of the first channel and the position of the second channel based on the second distance and the third distance may include determining first horizontal coordinates of the first channel and second horizontal coordinates of the second channel based on the second distance and the third distance, and determining first vertical coordinates of the first channel and second vertical coordinates of the second channel based on coordinates of the center of the cuboid.

The plurality of operations may further include determining positions of one or more of other channels of the sound source by using at least one of the first horizontal coordinates, the second horizontal coordinates, the first vertical coordinates, or the second vertical coordinates.

The determining of the position of the sound source of the object may include determining a position of a first channel of the sound source and a position of a second channel of the sound source based on a first field of view (FOV) of a head-mounted display (HMD), the coordinates of the cuboid, and the coordinates of the user.

The determining of the position of the first channel and the position of the second channel may include, when the first FOV is greater than a threshold value, obtaining a second FOV which is smaller than the first FOV, determining first horizontal coordinates of the first channel and second horizontal coordinates of the second channel based on the second FOV, the coordinates of the cuboid, and the coordinates of the user, and determining first vertical coordinates of the first channel and second vertical coordinates of the second channel based on coordinates of a center of the cuboid.

According to another aspect, there is provided a method of operating an acoustic signal processing device, the method including transforming an object provided as a spatially extended sound source into a cuboid in a VR space, obtaining coordinates of the cuboid, and determining a position of a sound source of the object based on the coordinates of the cuboid and coordinates of a user in the VR space.

The transforming of the object may include obtaining a first maximum value and a first minimum value among x-coordinates of the object, obtaining a second maximum value and a second minimum value among y-coordinates of the object, obtaining a third maximum value and a third minimum value among z-coordinates of the object, and forming the cuboid by using the first maximum value, the first minimum value, the second maximum value, the second minimum value, the third maximum value, and the third minimum value.

The determining of the position of the sound source of the object may include calculating a length of a short side of the cuboid and a length of a long side of the cuboid by using the coordinates of the cuboid, and determining a position of a first channel of the sound source and a position of a second channel of the sound source based on one of the length of the short side and the length of the long side.

The determining of the position of the first channel and the position of the second channel may include calculating a second distance between the user and the first channel and a third distance between the user and the second channel, based on a first distance between a center of the cuboid and the user and the one of the length of the short side and the length of the long side, and determining the position of the first channel and the position of the second channel based on the second distance and the third distance.

The determining of the position of the first channel and the position of the second channel based on the second distance and the third distance may include determining first horizontal coordinates of the first channel and second horizontal coordinates of the second channel based on the second distance and the third distance, and determining first vertical coordinates of the first channel and second vertical coordinates of the second channel based on coordinates of the center of the cuboid.

The method may further include determining positions of one or more of other channels of the sound source by using at least one of the first horizontal coordinates, the second horizontal coordinates, the first vertical coordinates, or the second vertical coordinates.

The determining of the position of the sound source of the object may include determining a position of a first channel of the sound source and a position of a second channel of the sound source based on an FOV of an HMD, the coordinates of the cuboid, and the coordinates of the user.

The determining of the position of the first channel and the position of the second channel may include, when the first FOV is greater than a threshold value, obtaining a second FOV which is smaller than the first FOV, determining first horizontal coordinates of the first channel and second horizontal coordinates of the second channel based on the second FOV, the coordinates of the cuboid, and the coordinates of the user, and determining first vertical coordinates of the first channel and second vertical coordinates of the second channel based on coordinates of a center of the cuboid.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
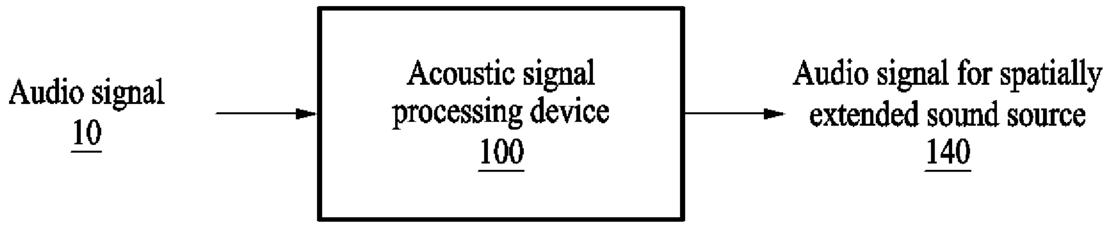
FIG. 1 is a diagram illustrating an acoustic signal processing device according to an embodiment.

The following structural or functional descriptions of embodiments described herein are merely intended for the purpose of describing the embodiments described herein and may be implemented in various forms. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an acoustic signal processing device according to an embodiment.

Referring to FIG. 1, according to an embodiment, for a virtual reality (VR) environment, an acoustic signal processing device 100 may output an audio signal 140 suitable for a spatially extended sound source (e.g., an object such as a helicopter) through processing (e.g., rendering) for an audio signal 10. For example, an object existing in the VR environment may be the spatially extended sound source. Although the embodiment describes the VR environment as an example for convenience of description, the environment is not limited to the VR environment, and the embodiment may be applied to various virtual environments, such as an augmented reality (AR) environment, extended reality (XR) environment, and the like.

According to an embodiment, the acoustic signal processing device 100 may determine a position of a sound source (or a spatially extended sound source) (e.g., an audio channel) with respect to an object. An operation of the acoustic signal processing device 100 will be described in detail with reference to FIGS. 4 to 15.

Figure 2:
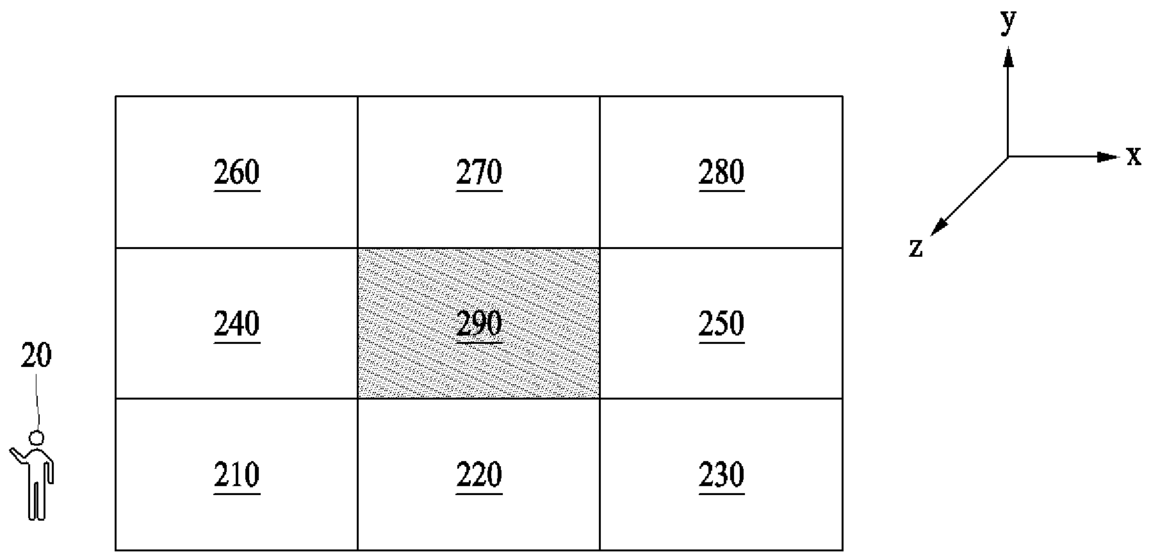
FIG. 2 is a diagram illustrating a virtual reality (VR) environment according to an embodiment.

FIG. 2 is a diagram illustrating the VR environment according to an embodiment.

Referring to FIG. 2, according to an embodiment, in the VR environment, a position of a user 20 may be defined based on a position (or region) 290 of the object. For example, the user 20 may be positioned inside the object (e.g., the position 290) or positioned outside the object (e.g., positions 210 to 280). In the VR environment, the position of the sound source with respect to the object may be determined based on the position 290 of the object and/or the position of the user 20. In the VR environment, the position (e.g., the position of the sound source, the position of the user, or the position of the object) may be expressed as coordinates. Hereinafter, for convenience of description, the description will be made using cartesian coordinates. However, the cartesian coordinates are merely an example for the description, and the cartesian coordinates should not be construed as limiting a scope of the disclosure.

Figure 3:
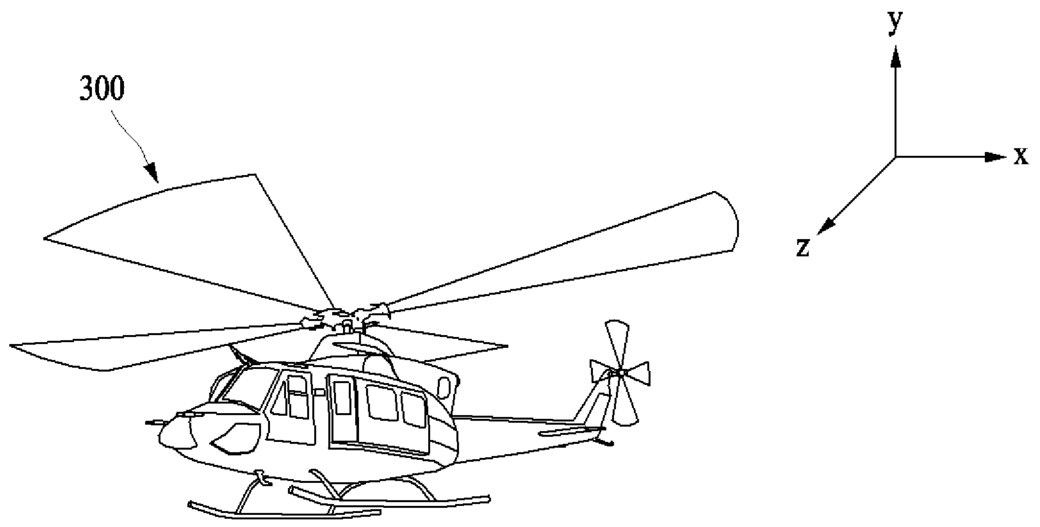
FIG. 3 is a diagram illustrating an object existing in a VR environment according to an embodiment.

FIG. 3 is a diagram illustrating an object existing in the VR environment according to an embodiment.

Referring to FIG. 3, according to an embodiment, various types of objects may exist in the VR environment. For example, objects having a complex shape such as a helicopter 300 may exist in the VR environment. In the VR environment, an object (e.g., the helicopter 300) may be a spatially extended sound source. The object 300 may include a mono sound source and/or a multi-channel sound source. For example, the object may include a 2-channel sound source, a 4-channel sound source, and/or a 9-channel sound source.

Figure 4:
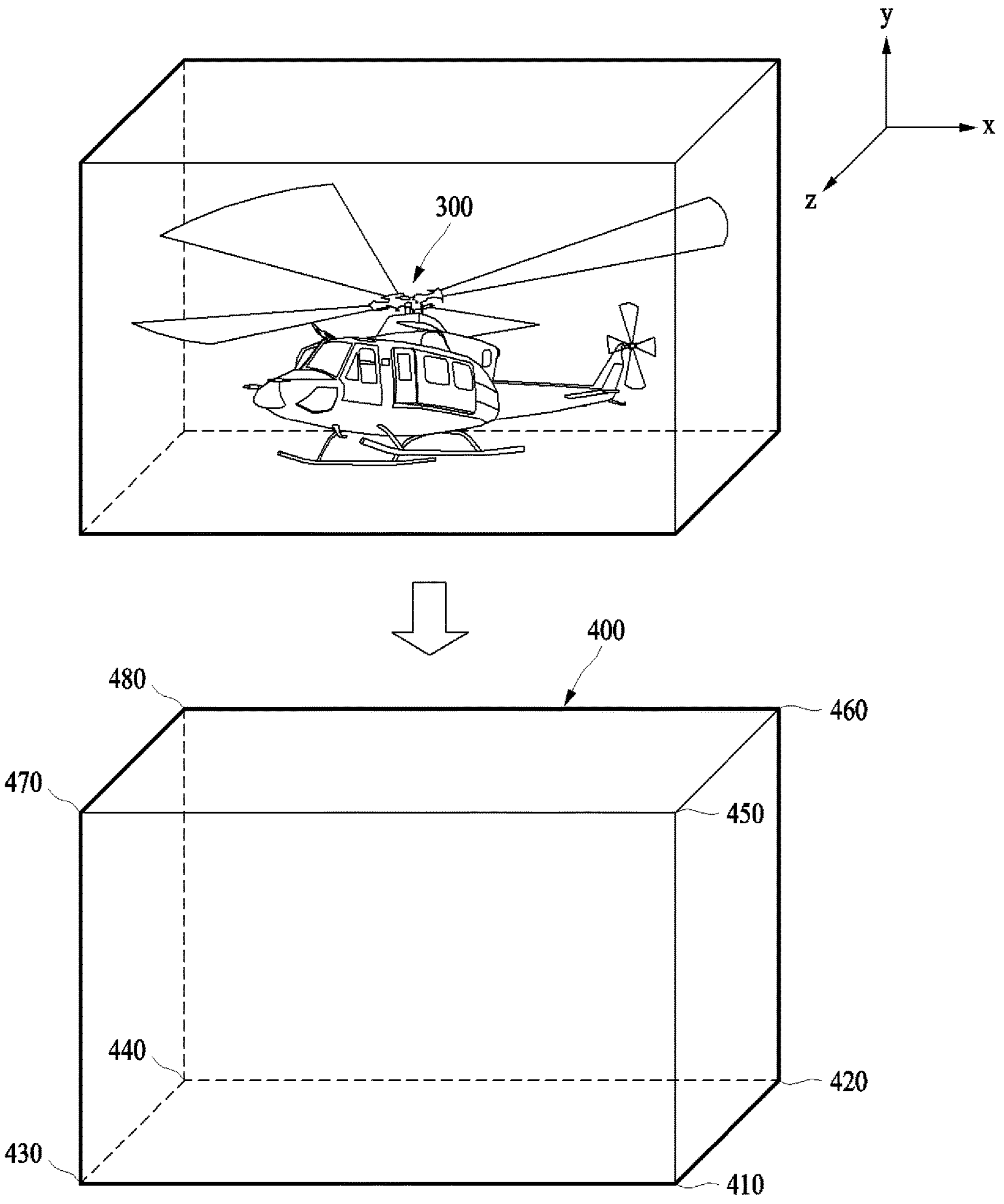
FIG. 4 is a diagram illustrating a method of transforming an object into a simple shape according to an embodiment.

FIG. 4 is a diagram illustrating a method of transforming an object into a simple shape according to an embodiment.

Referring to FIG. 4, according to an embodiment, an acoustic signal processing device (e.g., the acoustic signal processing device 100 of FIG. 1) may transform the object 300 into a cuboid 400 (e.g., a cuboid mesh) based on coordinates of the object 300. For example, the acoustic signal processing device 100 may transform the object 300 into the cuboid 400 by using a maximum value (e.g., x_max, y_max, and z_max) and a minimum value (e.g., x_min, y_min, and z_min) among the coordinates of the object 300 on each of an x axis, a y axis, and a z axis. For the cuboid 400, the coordinates of a vertex 410 may be (x_max, y_min, z_max), the coordinates of a vertex 420 may be (x_max, y_min, z_min), the coordinates of a vertex 430 may be (x_min, y_min, z_max), the coordinates of a vertex 440 may be (x_min, y_min, z_min), the coordinates of a vertex 450 may be (x_max, y_max, z_max), the coordinates of a vertex 460 may be (x_max, y_max, z_min), the coordinates of a vertex 470 may be (x_min, y_max, z_max), and the coordinates of a vertex 480 may be (x_min, y_max, z_min).

Figure 5:
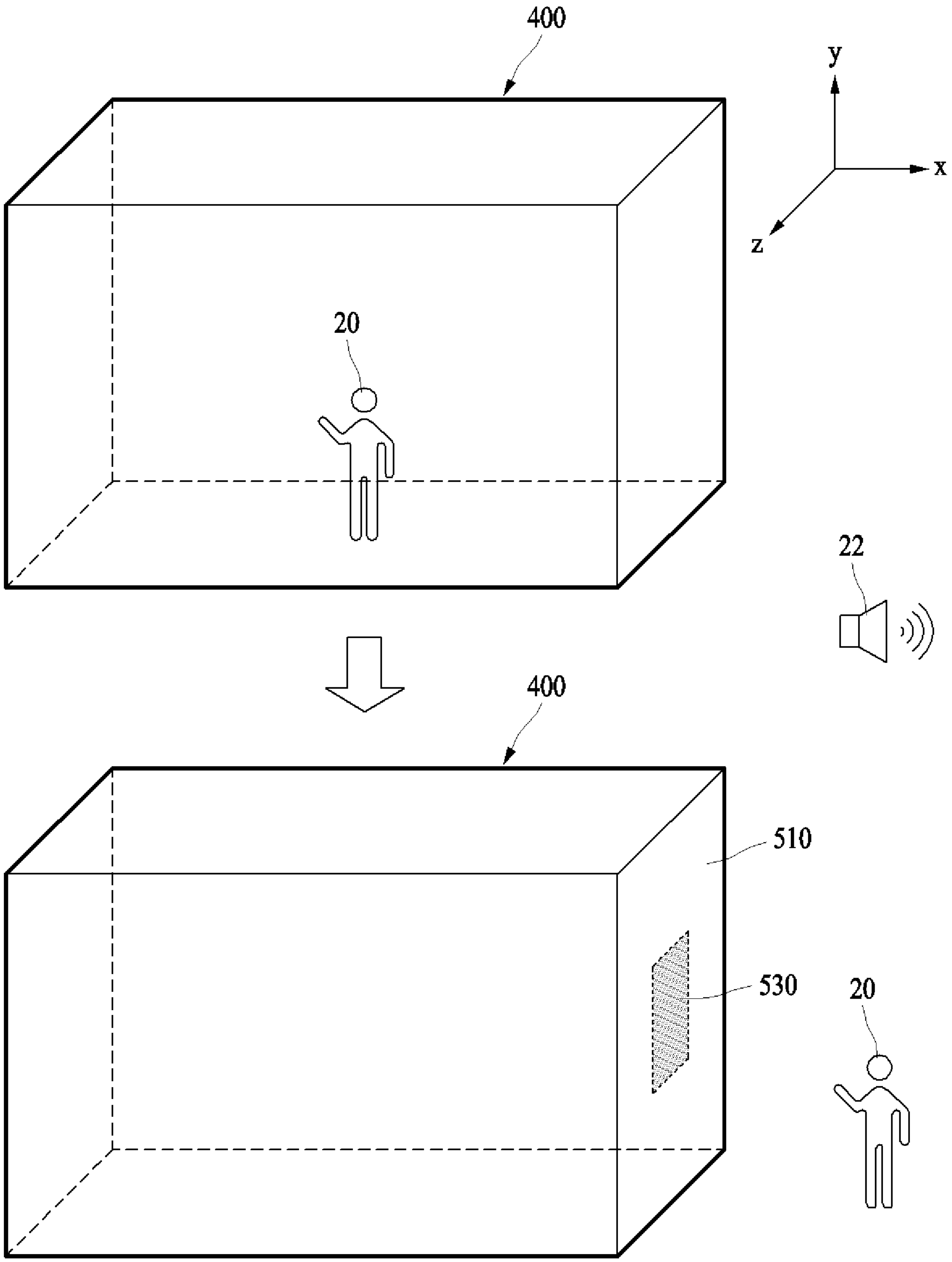
FIG. 5 is a diagram illustrating a mono sound source according to an embodiment.

FIG. 5 is a diagram illustrating a mono sound source according to an embodiment.

Referring to FIG. 5, according to an embodiment, in the VR environment, an object (e.g., the object 300 of FIGS. 2 and 3) may be a mono sound source. For the signal processing of the mono sound source (e.g., the object 300), an acoustic signal processing device (e.g., the acoustic signal processing device 100 of FIG. 1) may transform the object 300 into the cuboid 400 (e.g., a cuboid mesh). The acoustic signal processing device 100 may localize a sound source 22 based on the position of the user 20. For example, when the user 20 is inside the cuboid 400, the acoustic signal processing device 100 may localize the sound source 22 at the position of the user 20. In other words, an x-coordinate of the sound source 22 may be the same as an x-coordinate of the user 20, and a z-coordinate of the sound source 22 may be the same as a z-coordinate of the user 20. When the user 20 is outside the cuboid 400, the acoustic signal processing device 100 may localize the sound source 22 at a portion 530 of a surface 510, which is closest to the user among the surfaces of the cuboid. In other words, the x-coordinate of the sound source 22 may be the same as an x-coordinate of the portion 530 of the surface 510, and the z-coordinate of the sound source 22 may be the same as a z-coordinate of the portion 530 of the surface 510. The acoustic signal processing device 100 may determine a y-coordinate of the sound source 22 based on a y-coordinate of the user 20. For example, the y-coordinate of the sound source 22 may be the same as the y-coordinate of the user 20. The acoustic signal processing device 100 may also determine the y-coordinate of the sound source 22 based on coordinates of a center of the cuboid 400. For example, the y-coordinate of the sound source 22 may be the same as the y-coordinate of the center of the cuboid 400.

Figure 6:
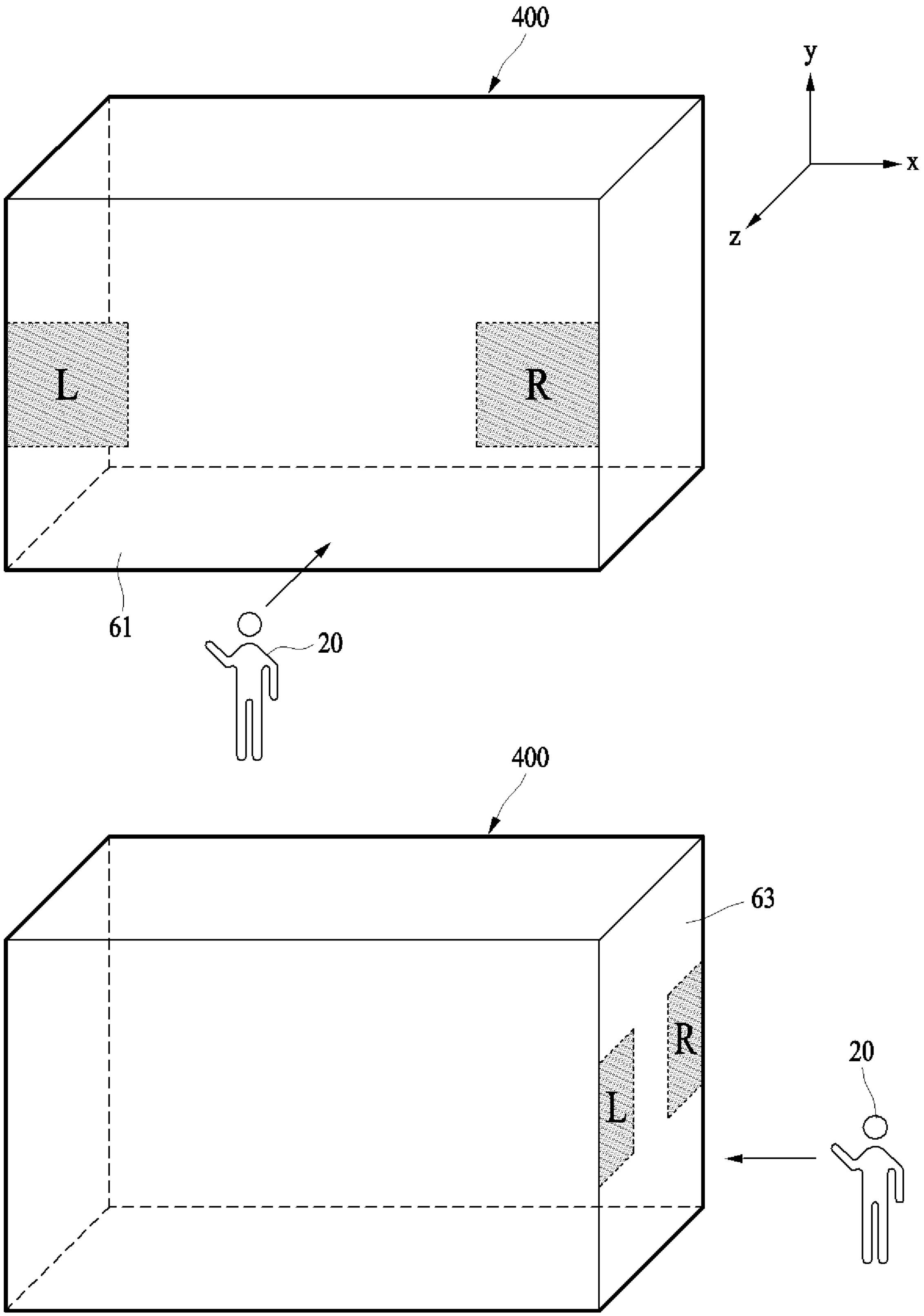
FIG. 6 is a diagram illustrating a multi-channel sound source according to an embodiment.

FIG. 6 is a diagram illustrating a multi-channel sound source according to an embodiment.

Referring to FIG. 6, according to an embodiment, in the VR environment, an object (e.g., the object 300 of FIGS. 2 and 3) may be a 2-channel sound source. For the signal processing of the 2-channel sound source (e.g., the object 300), an acoustic signal processing device (e.g., the acoustic signal processing device 100 of FIG. 1) may transform the object 300 into the cuboid 400 (e.g., a cuboid mesh). The acoustic signal processing device 100 may determine positions of channels (e.g., a left channel L and a right channel R) based on the position of the user 20. For example, the acoustic signal processing device 100 may arrange the channels L and R on a surface (e.g., a surface 61 or a surface 63) that is closest to the user 20 among the surfaces of the cuboid 400. The acoustic signal processing device 100 may arrange the channels L and R inside or outside the cuboid 400. A method of determining the positions of the left channel L and the right channel R will be described in detail with reference to FIGS. 9 and 10.

Figure 7:
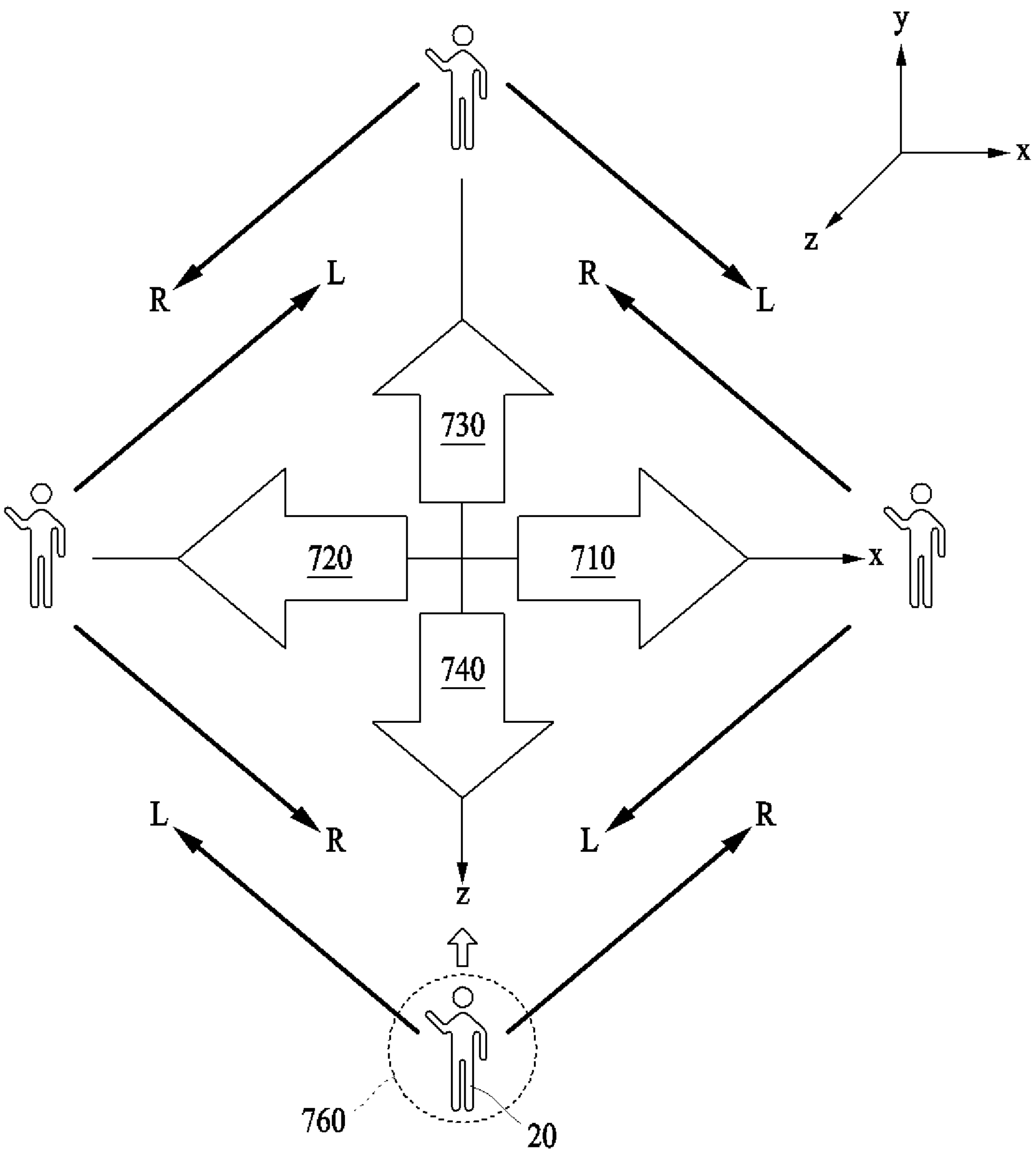
FIG. 7 is a diagram illustrating a relationship between an orientation of a sound source and channels according to an embodiment.

FIG. 7 is a diagram illustrating a relationship between an orientation of a sound source and channels according to an embodiment.

Referring to FIG. 7, according to an embodiment, an acoustic signal processing device (e.g., the acoustic signal processing device 100 of FIG. 1) may determine the arrangement of the left channel L and the right channel R based on an orientation (e.g., one of orientations 710 to 740) of an object (e.g., the object 300 of FIGS. 2 and 3). For example, when the user 20 is in a place 760 and the orientation of the object 300 is the same as the orientation 740, the left channel L may be positioned on the left side of the user 20 and the right channel R may be positioned on the right side of the user 20. In another example, when the user 20 is in the place 760 and the orientation of the object 300 is the same as the orientation 730, the left channel L may be positioned on the right side of the user 20 and the right channel R may be positioned on the left side of the user 20.

Figure 8:
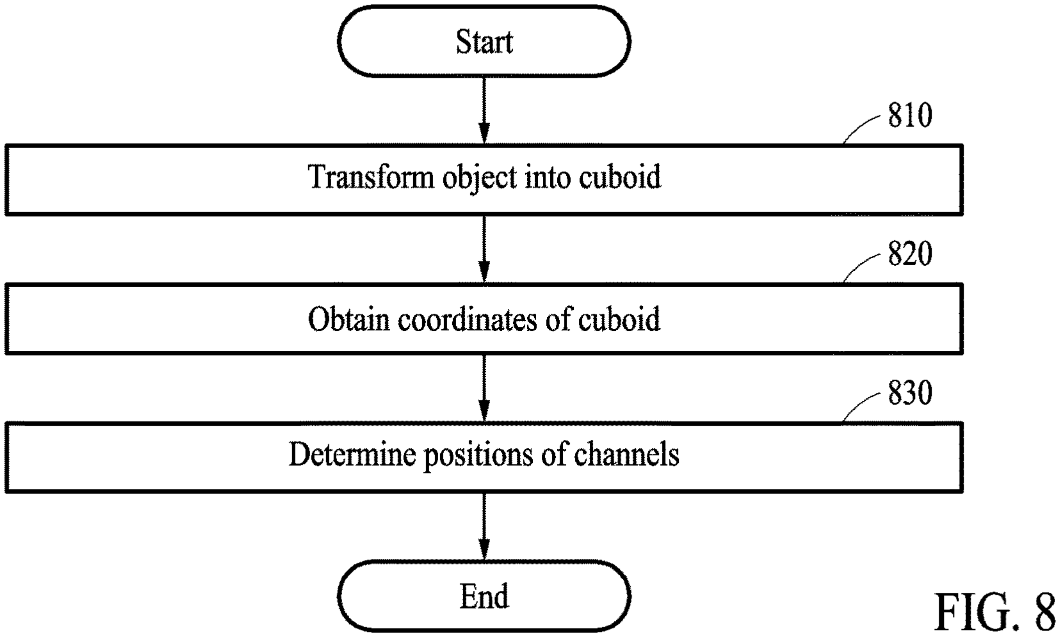
FIG. 8 is a flowchart illustrating an operation of an acoustic signal processing device according to an embodiment.

FIG. 8 is a flowchart illustrating an operation of an acoustic signal processing device according to an embodiment.

Referring to FIG. 8, according to an embodiment, operations 810 to 830 may be performed sequentially, but are not limited thereto. For example, two or more operations may be performed in parallel.

In operation 810, an acoustic signal processing device (e.g., the acoustic signal processing device 100 of FIG. 1) may transform an object (e.g., the object 300 of FIGS. 2 and 3) into a cuboid (e.g., the cuboid 400 of FIGS. 4 to 6). A method of transforming the object 300 into the cuboid 400 may be substantially the same as the transforming method described above with reference to FIG. 4. Accordingly, further description thereof is not repeated herein.

In operation 820, the acoustic signal processing device 100 may obtain coordinates of the cuboid 400. For example, the acoustic signal processing device 100 may obtain coordinates of the vertices (e.g., the vertices 410 to 480 of FIG. 4) of the cuboid 400.

In operation 830, the acoustic signal processing device 100 may determine the position of the sound source (or the spatially extended sound source) (e.g., the channels L and R of FIGS. 6 and 7) based on the coordinates of the cuboid 400 and the coordinates of the user (e.g., the user 20 of FIGS. 2, 5, 6, and 7). A method of determining the position of the sound source will be described in detail with reference to FIGS. 9 and 10.

According to an embodiment, the acoustic signal processing device 100 may provide a method of easily localizing a sound image by transforming the object 300 having a complex shape into the cuboid 400.

The acoustic signal processing device 100 according to an embodiment may reduce the amount of computation for acoustic signal processing by transforming the object 300 having a complex shape into the cuboid 400.

Figure 9:
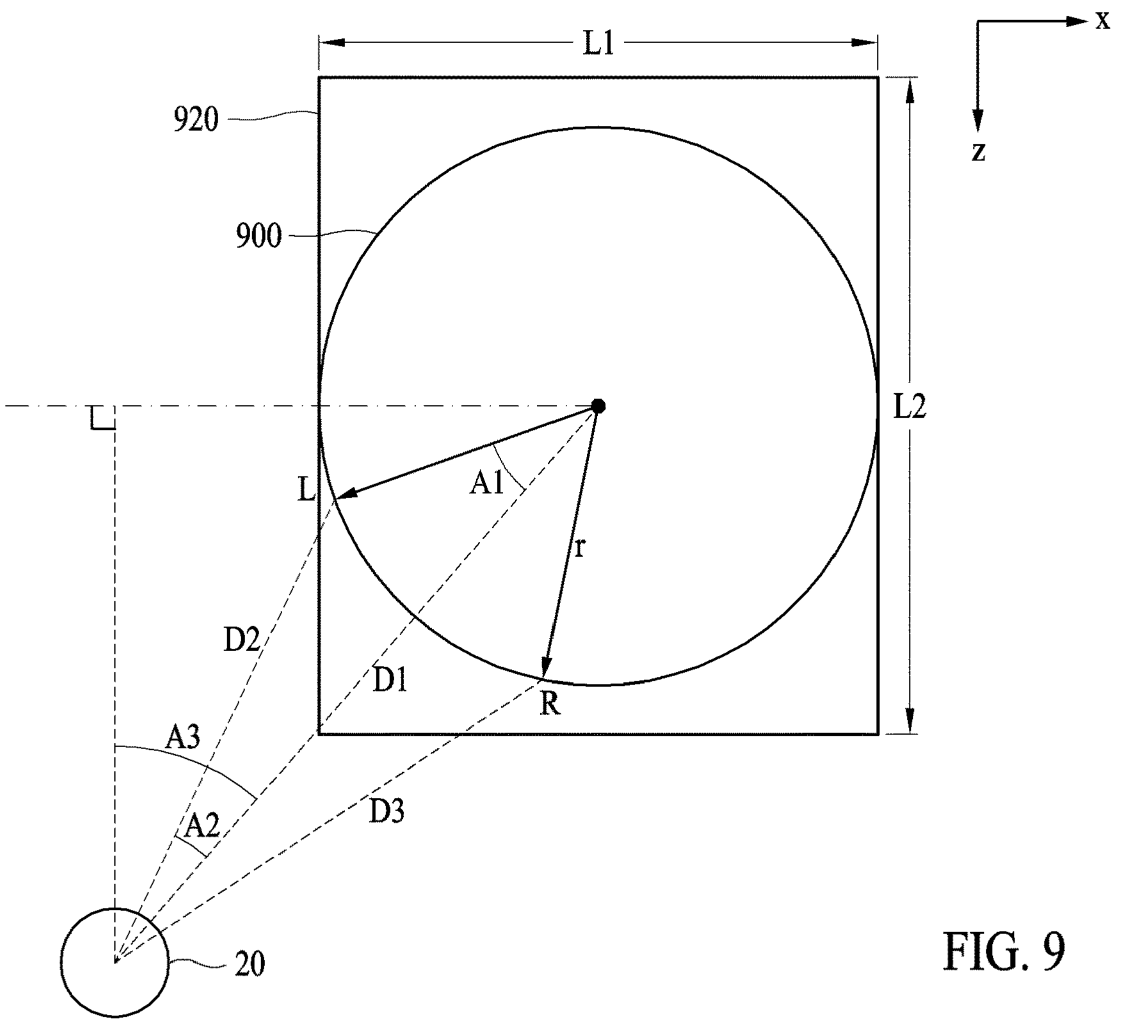
FIG. 9 is a diagram illustrating relative positions of an object and a user according to an embodiment.
Figure 10:
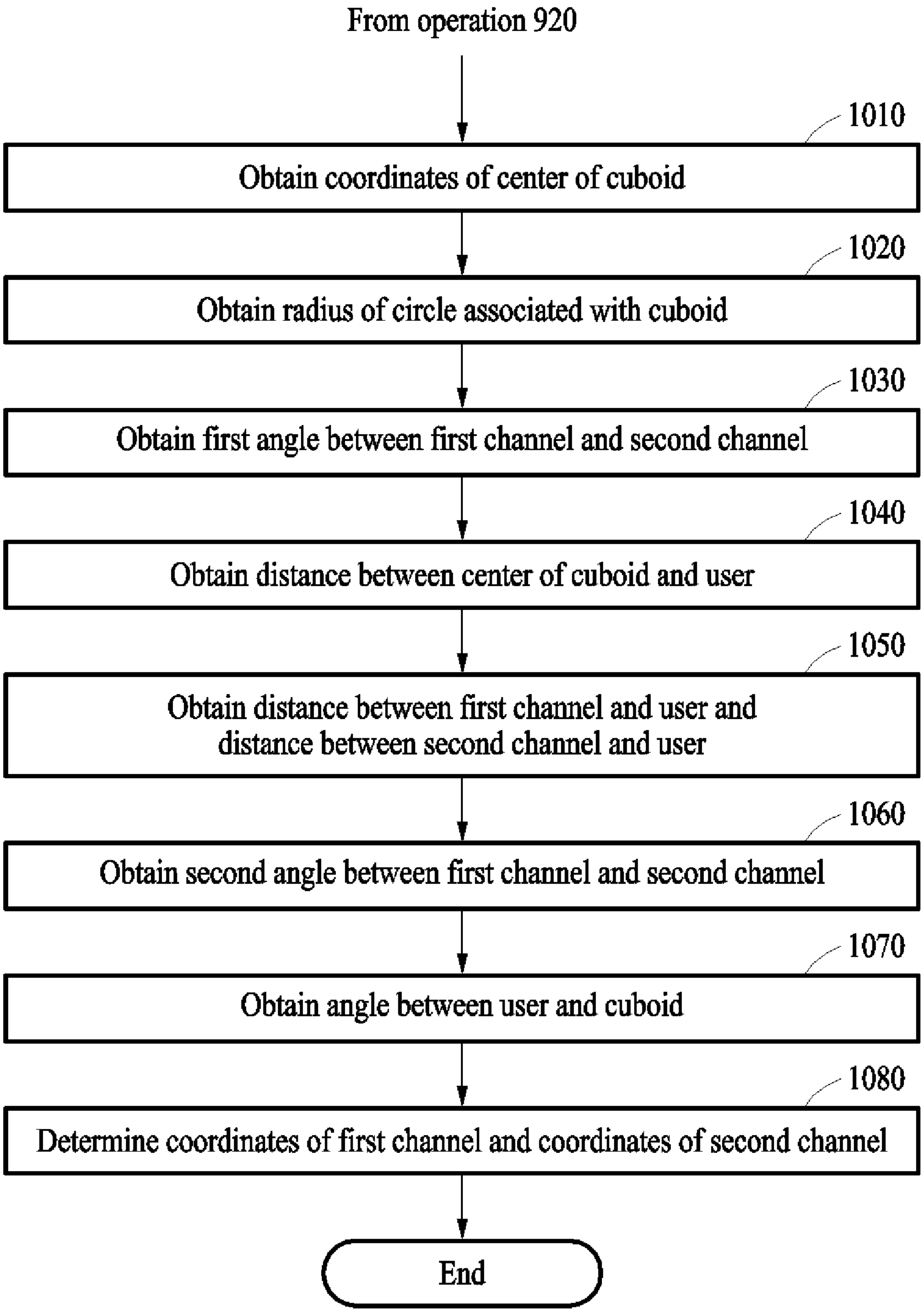
FIG. 10 is a flowchart illustrating a method of determining a position of a sound source according to an embodiment.

FIGS. 9 and 10 are diagrams illustrating a method of determining a position of a sound source according to an embodiment. FIG. 9 may be a diagram illustrating relative positions of an object and a user according to an embodiment and FIG. 10 may be a flowchart illustrating a method of determining a position of a sound source according to an embodiment.

Referring to FIGS. 9 and 10, operations 1010 to 1080 may be performed sequentially, but are not limited thereto. For example, two or more operations may be performed in parallel.

In operation 1010, an acoustic signal processing device (e.g., the acoustic signal processing device 100 of FIG. 1) may obtain coordinates of a center of a cuboid (e.g., the cuboid 400 of FIGS. 4 to 6) by using coordinates of the cuboid 400. For example, the acoustic signal processing device 100 may obtain the coordinates of the center of the cuboid 400 by using coordinates of vertices (e.g., the vertices 410 to 480 of FIG. 4) of the cuboid 400. This may be expressed by the equation below.

$$obj\_center\_x = \frac{max\_x + min\_x}{2} \quad \text{[Equation 1]}$$

$$obj\_center\_y = \frac{max\_y + min\_y}{2}$$

$$obj\_center\_z = \frac{max\_z + min\_z}{2}$$

Herein, obj_center_x, obj_center_y, and obj_center_z may represent the coordinates of the center of the cuboid 400, max_x and min_x may represent the x-coordinates of the vertices 410 to 480 of the cuboid 400, max_y and min y may represent the y-coordinates of the vertices 410 to 480 of the cuboid 400, and max_z and min_z may represent the z-coordinates of the vertices 410 to 480 of the cuboid 400.

In operation 1020, the acoustic signal processing device 100 may obtain a radius r of a circle 900 (or a sphere) associated with the cuboid 400. The acoustic signal processing device 100 may calculate the radius r by using a length of a side of a cross-section 920 (e.g., a rectangular cross-section) of the cuboid 400 perpendicular to the y-axis. For example, the radius r may be equal to half of a length L1 of a short side among the sides of the cross-section 920. In another example, the radius r may be equal to half of a length L2 of a long side among the sides of the cross-section 920. This may be expressed by the equation below. When the radius r is equal to the half of the length L2 of the long side, the sound source (or the spatially extended sound source) (e.g., the channels L and R of FIGS. 6 and 7) may be localized at the outside of the cuboid 400. Hereinafter, for convenience of description, the case in which the radius r is equal to the half of the length L1 of the short side will be described as an example.

$$r = \frac{L1}{2} = \frac{max\_x - min\_x}{2} \quad \text{[Equation 2]}$$

$$r = \frac{L2}{2} = \frac{max\_z - min\_z}{2}$$

In operation 1030, the acoustic signal processing device 100 may obtain a first angle A1 between a first channel (e.g., the left channel L) and a second channel (e.g., the right channel R). For example, the acoustic signal processing device 100 may calculate the first angle A1 by using the length L1 of the short side and the length L2 of the long side. This may be expressed by the equation below.

$$A1 = \tan^{-1}\left(\frac{L1}{L2}\right) = \tan^{-1}\left(\frac{\text{max\_x} - \text{min\_x}}{\text{max\_z} - \text{min\_z}}\right) \quad \text{[Equation 3]}$$

In operation 1040, the acoustic signal processing device 100 may obtain a distance D1 between the center of the cuboid 400 and the user 20. For example, the acoustic signal processing device 100 may calculate the distance D1 by using the coordinates of the center of the cuboid 400 and the coordinates of the user 20. This may be expressed by the equation below.

$$D1 = \sqrt{(\text{u\_x} - \text{obj\_center\_x})^2 + (\text{u\_y} - \text{obj\_center\_y})^2 + (\text{u\_z} - \text{obj\_center\_z})^2} \quad \text{[Equation 4]}$$

Here, u_x, u_y, and u_z may represent the coordinates of the user 20.

In operation 1050, the acoustic signal processing device 100 may obtain a distance D2 between the first channel (e.g., the left channel L) and the user 20 and a distance D3 between the second channel (e.g., the right channel R) and the user 20. For example, the acoustic signal processing device 100 may calculate the distance D2 and the distance D3 using the distance D1, the radius r, and the first angle A1. The distance D2 and the distance D3 may be equal to each other. This may be expressed by the equation below.

$$D2 = D3 = \sqrt{(D1 - r\cos A1)^2 + (r\sin A1)^2} \quad \text{[Equation 5]}$$

According to an embodiment, the acoustic signal processing device 100 may adjust a distance between the user 20 and an object (e.g., the object 300 of FIGS. 3 and 4). For example, the acoustic signal processing device 100 may adjust the distance between the user 20 and the object by using a control factor for the distance D2 and the distance D3. This may be expressed by the equation below.

$$D2' = D2 \times f$$

$$D3' = D3 \times f \quad \text{[Equation 6]}$$

Here, f may represent a control factor. According to an embodiment, the acoustic signal processing device 100 may arrange a sound source (e.g., the channels L and R) outside the cuboid 400 using the control factor. When the sound source is arranged outside the cuboid 400, the sound image may be localized in a range larger than the object 300, and the user 20 may feel the object 300 as a large sound source.

In operation 1060, the acoustic signal processing device 100 may obtain a second angle A2 between the first channel (e.g., the left channel L) and the second channel (e.g., the right channel R). For example, the acoustic signal processing device 100 may calculate the second angle A2 using the distance D1, the radius r, and the first angle A1. This may be expressed by the equation below.

$$A2 = \tan^{-1}\left(\frac{r\sin A1}{D1 - r\cos A1}\right) \quad \text{[Equation 7]}$$

In operation 1070, the acoustic signal processing device 100 may obtain an angle A3 (e.g., a reference angle) between the user 20 and the cuboid 400. For example, the acoustic signal processing device 100 may calculate the angle A3 using the coordinates of the user 20 and the coordinates of the center of the cuboid 400. This may be expressed by the equation below.

$$A3 = \tan^{-1}\left(\frac{|\text{u\_x} - \text{obj\_center\_x}|}{|\text{u\_z} - \text{obj\_center\_z}|}\right) \quad \text{[Equation 8]}$$

Here, u_x may represent the x-coordinate of the user 20, U_Z may represent the z-coordinate of the user 20, obj_center_x may represent the x-coordinate of the center of the cuboid 400, and obj_center_z may represent the z-coordinate of the center of the cuboid 400.

In operation 1080, the acoustic signal processing device 100 may determine the coordinates of the first channel (e.g., the left channel L) and the coordinates of the second channel (e.g., the right channel R). For example, the acoustic signal processing device 100 may calculate horizontal coordinates (e.g., the x-coordinate and the z-coordinate) of the first channel L and horizontal coordinates of the second channel R by using the x-coordinate of the user 20, the z-coordinate of the user 20, the distance D2 (or the distance D3), the second angle A2, and the reference angle A3. This may be expressed by the equations below.

$$L_x = u\_x - R\sin(A2 + A3)$$

$$L_z = u\_z - R\cos(A2 + A3) \quad \text{[Equation 9]}$$

Here, $L_x$ may represent the x-coordinate of the first channel L, $L_z$ may represent the z-coordinate of the first channel L, u_x may represent the x-coordinate of the user 20, and u_Z may represent the z-coordinate of the user 20.

$$R_x = u\_x - R\sin(A3 - A2)$$

$$R_z = u\_z - R\cos(A3 - A2) \quad \text{[Equation 10]}$$

Here, $R_x$ may represent the x-coordinate of the second channel R and $R_z$ may represent the z-coordinate of the second channel R.

According to an embodiment, the acoustic signal processing device 100 may determine the y-coordinate of the first channel L and the y-coordinate of the second channel R by using the y-coordinate of the cuboid 400. For example, the y-coordinate of the first channel L and the y-coordinate of the second channel R may be the same as the y-coordinate of the cuboid 400.

Figure 11:
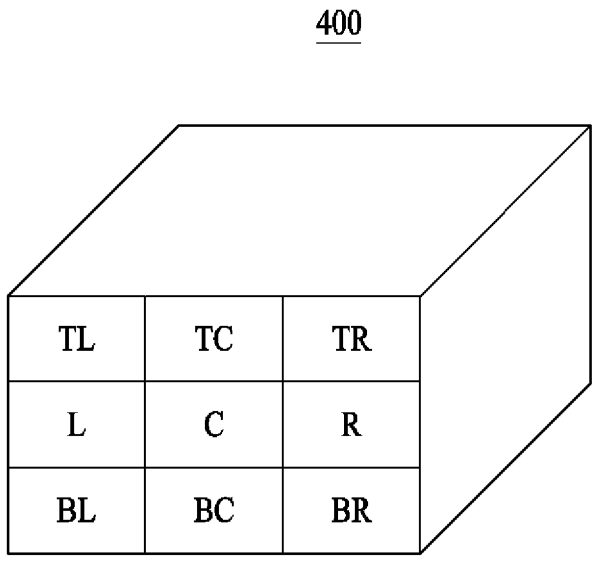
FIG. 11 is a diagram illustrating a multi-channel sound source according to an embodiment.

FIG. 11 is a diagram illustrating a multi-channel sound source according to an embodiment.

Referring to FIG. 11, according to an embodiment, an acoustic signal processing device (e.g., the acoustic signal processing device 100 of FIG. 1) may determine positions of channels (not shown) of a 4-channel sound source and positions of channels (e.g., C, TL, TC, TR, BL, BC, and BR) of a 9-channel sound source based on the coordinates of the first channel (e.g., the left channel L of FIGS. 6, 7, and 9) and the coordinates of the second channel (e.g., the right channel R of FIGS. 6, 7, and 9). For example, the acoustic signal processing device 100 may determine horizontal coordinates of the channel C by using the horizontal coordinates of the first channel L and the horizontal coordinates of the second channel R. The y-coordinate of the channel C may be the same as the y-coordinate of the first channel L and the y-coordinate of the second channel R. The acoustic signal processing device 100 may determine the coordinates of the channels TL, TC, TR, BL, BC, and BR by using the y-coordinates of the channels L, C, and R. For example, the y-coordinate of the channels TL, TC, and TR may be larger than the y-coordinate of the channels L, C, and R. The y-coordinate of the channels BL, BC, and BR may be smaller than the y-coordinate of the channels L, C, and R.

Figure 12:
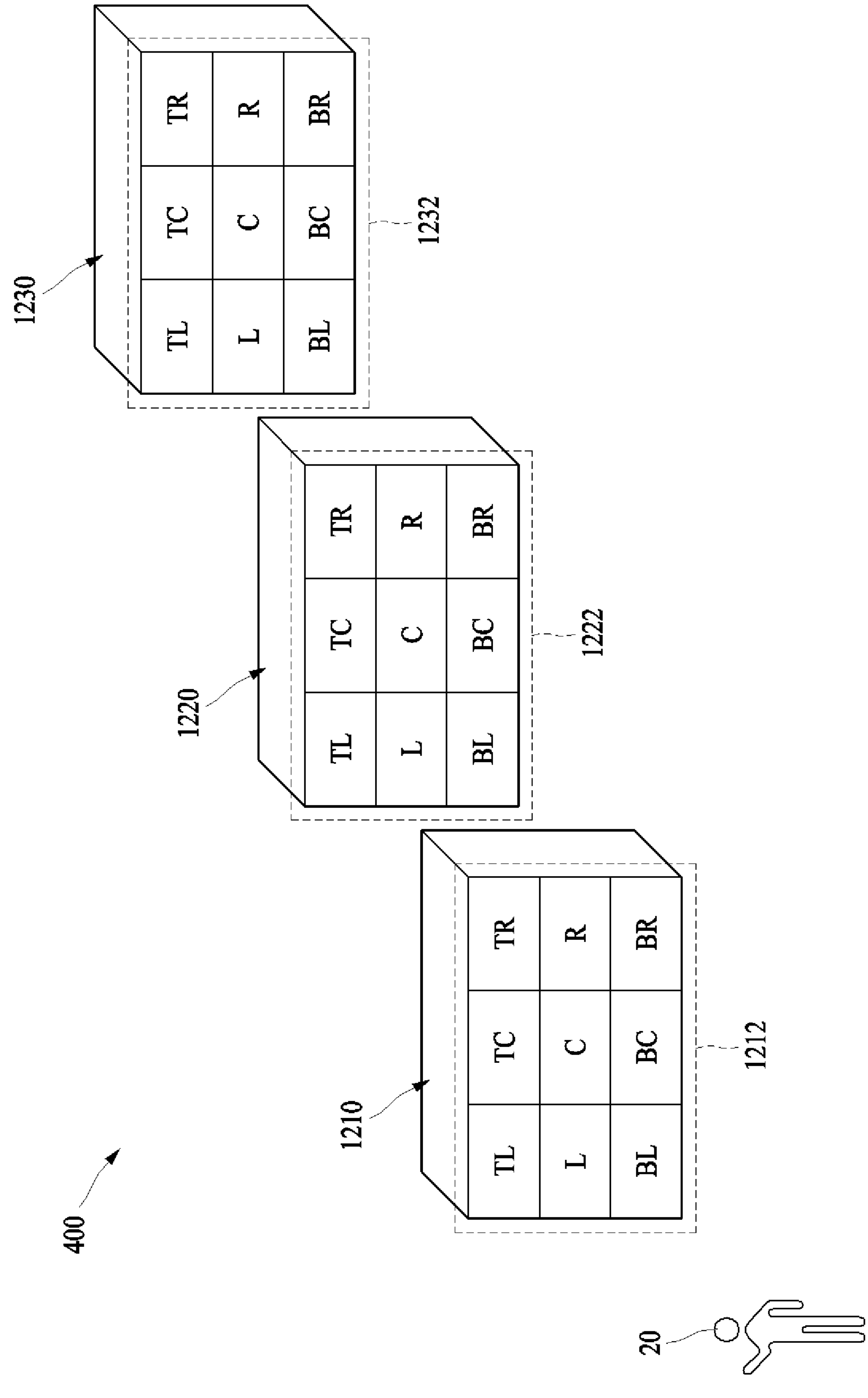
FIG. 12 is a diagram illustrating a multi-channel sound source according to an embodiment.

FIG. 12 is a diagram illustrating a multi-channel sound source according to an embodiment.

Referring to FIG. 12, according to an embodiment, an acoustic signal processing device (e.g., the acoustic signal processing device 100 of FIG. 1) may arrange channels (e.g., TL, TC, TR, L, C, R, BL, BC, and BR) on a surface 1212 of the cuboid 400 that is closest to the user 20. In another example, the acoustic signal processing device 100 may divide the cuboid into three layers (e.g., layers 1210, 1220, and 1230) and may arrange the channels (e.g., TL, TC, TR, L, C, R, BL, BC, and BR) on a surface 1222 of the layer 1220 or a surface 1232 of the layer 1230. The number of layers 1210 to 1230 shown in FIG. 12 is merely an example for description, and is not limited thereto.

Figure 13:
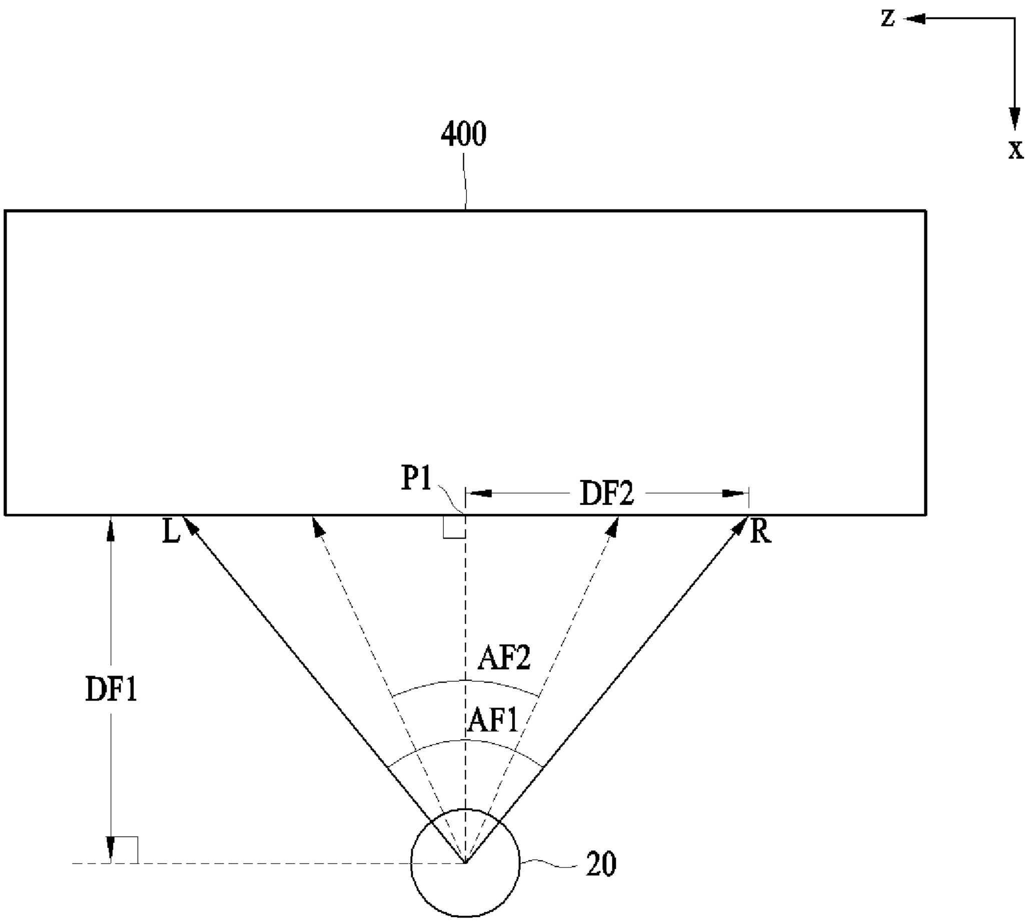
FIG. 13 is a diagram illustrating a relationship between a field of view of a head-mounted display (HMD) and a position of a sound source according to an embodiment.
Figure 14:
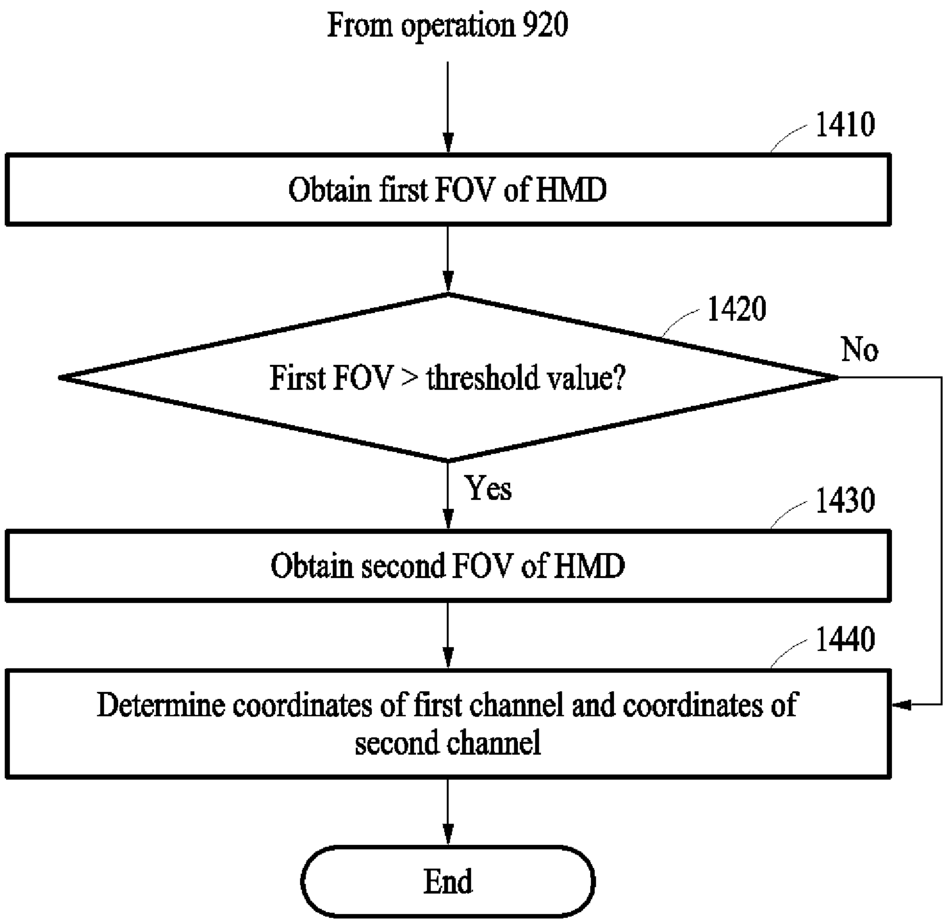
FIG. 14 is a flowchart illustrating a method of determining a position of a sound source by using a field of view of the HMD according to an embodiment.

FIGS. 13 and 14 are diagrams illustrating a method of determining a position of a sound source by using a field of view of a head-mounted display (HMD) according to an embodiment. FIG. 13 may be a diagram illustrating a relationship between a field of view of an HMD and a position of a sound source according to an embodiment and FIG. 14 may be a flowchart illustrating a method of determining a position of a sound source by using a field of view of the HMD according to an embodiment.

Referring to FIGS. 13 and 14, operations 1410 to 1440 may be performed sequentially, but are not limited thereto. For example, two or more operations may be performed in parallel.

In operation 1410, an acoustic signal processing device (e.g., the acoustic signal processing device 100 of FIG. 1) may obtain a first field of view (FOV) AF1 of the HMD. The first FOV AF1 may include an FOV of the HMD in a horizontal direction. The first FOV AF1 may be a specification of the HMD determined at a manufacturing stage of the HMD. The acoustic signal processing device 100 may calculate the FOV of the HMD in the horizontal direction by using an FOV of the HMD in a vertical direction. This may be expressed by the equation below.

$$hFOV = 2\times\tan^{-1}\left(\tan\left(\frac{vFOV}{2}\right)\times\text{aspect\_ratio}\right) \quad \text{[Equation 11]}$$

Here, hFOV may represent the FOV of the HMD in the horizontal direction, VFOV may represent the FOV of the HMD in the vertical direction, and aspect_ratio may represent an aspect ratio of the HMD.

In operation 1420, the acoustic signal processing device 100 may compare the first FOV AF1 with a threshold value.

In operation 1430, when the first FOV AF1 is greater than the threshold value, the acoustic signal processing device 100 may obtain a second FOV AF2 of the HMD. The second FOV AF2 may include an FOV of the HMD in the horizontal direction. For example, the second FOV AF2 may be smaller than the first FOV AF1.

In operation 1440, the acoustic signal processing device 100 may determine the coordinates of the first channel (e.g., the left channel L) and the coordinates of the second channel (e.g., the right channel R). When the first FOV AF1 is smaller than the threshold value, the acoustic signal processing device 100 may determine the horizontal coordinates of the first channel L and the horizontal coordinates of the second channel R by using the first FOV AF1. This may be expressed by the equation below.

$$DF1=|\text{min\_}x-u\_x| \quad \text{[Equation 12]}$$

Here, min_x may represent an x-coordinate of a point P1 and u_x may represent the x-coordinate of the user 20.

$$DF2 = DF1\times\tan\left(\frac{AF1}{2}\right) \quad \text{[Equation 13]}$$

$$Lx=\text{min\_}x$$

$$Lz=u\_z+DF2 \quad \text{[Equation 14]}$$

Here, Lx may represent the x-coordinate of the first channel L, Lz may represent the z-coordinate of the first channel L, and u_z may represent the z-coordinate of the user 20.

$$Rx=\text{min\_}x$$

$$Rz=u\_z-DF2 \quad \text{[Equation 15]}$$

Here, RX may represent the x-coordinate of the second channel L and RZ may represent the z-coordinate of the second channel L.

According to an embodiment, the y-coordinate of the first channel L and the y-coordinate of the second channel R may be set variously. For example, the y-coordinate of the first channel L and the y-coordinate of the second channel R may be the same as the y-coordinate of the user 20. In another example, the y-coordinate of the first channel L and the y-coordinate of the second channel R may be the same as the y-coordinate of the center of the cuboid 400. The y-coordinate of the first channel L may be different from the y-coordinate of the second channel R. For example, the y-coordinate of the first channel L is the same as the y-coordinate of the user 20, and the y-coordinate of the second channel R may be the same as the y-coordinate of the center of the cuboid 400.

According to an embodiment, the acoustic signal processing device 100 may determine the positions of channels (not shown) of a 4-channel sound source and positions of channels (e.g., C, TL, TC, TR, BL, BC, and BR) of a 9-channel sound source by using the coordinates of the first channel L and the coordinates of the second channel R. A method of determining the positions of the channels (not shown) of the 4-channel sound source and the channels (e.g., C, TL, TC, TR, BL, BC, and BR) of the 9-channel sound source may be substantially the same as the method of determining the positions of the multi-channels described above with reference to FIG. 11. Accordingly, further description thereof is not repeated herein.

According to an embodiment, the acoustic signal processing device 100 may appropriately localize a sound image of an object (e.g., the object 300) having a long length in the horizontal direction by determining the horizontal coordinates of the first channel L and the horizontal coordinates of the second channel R based on the FOV (e.g., the first FOV (AF1) and/or the second FOV (AF2)) of the HMD.

According to an embodiment, the acoustic signal processing device 100 may arrange the first channel L and the second channel R based on a general multi-channel audio arrangement technique. Each angle (not shown) between the first channel L, the user 20, and the second channel R may be 30 degrees.

Figure 15:
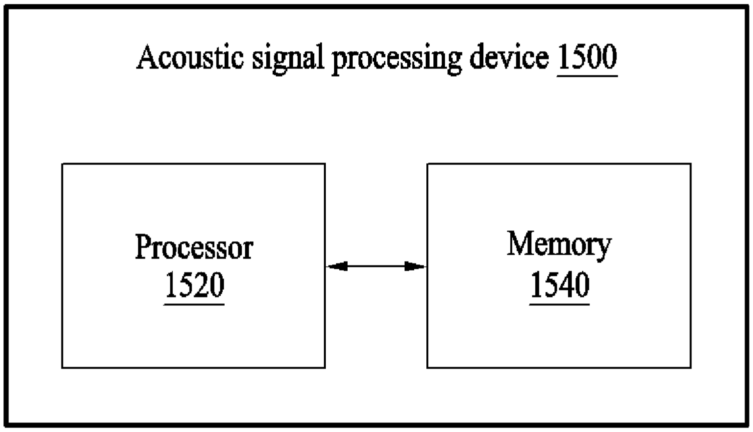
FIG. 15 is a schematic block diagram of an acoustic signal processing device according to an embodiment.

FIG. 15 is a schematic block diagram of an acoustic signal processing device according to an embodiment.

Referring to FIG. 15, according to an embodiment, an acoustic signal processing device 1500 (e.g., the acoustic signal processing device 100 of FIG. 1) may include a memory 1540 and a processor 1520.

The memory 1540 may store instructions (or programs) executable by the processor 1520. For example, the instructions may include instructions for performing an operation of the processor 1520 and/or an operation of each component of the processor 1520.

The processor 1520 may process data stored in the memory 1540. The processor 1520 may execute computer-readable code (e.g., software) stored in the memory 1540 and instructions triggered by the processor 1520.

The processor 1520 may be a data processing device embodied by hardware having a circuit of a physical structure to execute desired operations. The desired operations may include, for example, codes or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

An operation performed by the processor 1520 may be substantially the same as the operation of the acoustic signal processing device 100 described with reference to FIGS. 4 to 14. Accordingly, detailed description thereof is not repeated herein.

The embodiments described herein may be implemented using a hardware component, a software component and/or a combination thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor, and a single controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the embodiments described herein may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as a compact disc read-only memory (CD-ROM) and digital video disks (DVDs); magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An acoustic signal processing device comprising:

a memory configured to store instructions; and a processor electrically connected to the memory and configured to execute the instructions, wherein, when the instructions are executed by the processor, the processor is configured to perform a plurality of operations, and the plurality of operations comprises:

transforming an object provided as a spatially extended sound source into a cuboid in a virtual reality (VR) space;

obtaining coordinates of the cuboid;

determining a position of a sound source of the object based on the coordinates of the cuboid and coordinates of a user in the VR space; and outputting sound of the spatially extended sound source based on the position of the sound source of the object, wherein the determining the position of the sound source of the object comprises the determining the position of the sound source of the object based on a first distance between a center of the cuboid and the user, a second distance between the user and a first channel of the sound source, and a third distance between the user and a second channel of the sound source, wherein the second distance and the third distance are calculated based on the first distance, a radius, and an angle, and wherein the radius is a radius of a circle associated with the cuboid, wherein the radius is a length of a side of a cross-section of the cuboid perpendicular to y-axis, and equal to half of a length of a short side among the sides of the cross-section or equal to half of a length of a long side among the sides of the cross-section, and wherein the angle is an arctangent of the half of a length of a short side among the sides of the cross-section divided by half of a length of a long side among the sides of the cross-section.

2. The acoustic signal processing device of claim 1, wherein the transforming of the object comprises:

obtaining a first maximum value and a first minimum value among x-coordinates of the object;

obtaining a second maximum value and a second minimum value among y-coordinates of the object;

obtaining a third maximum value and a third minimum value among z-coordinates of the object; and forming the cuboid by using the first maximum value, the first minimum value, the second maximum value, the second minimum value, the third maximum value, and the third minimum value.

3. The acoustic signal processing device of claim 1, wherein the determining of the position of the sound source of the object based on the first distance comprises:

calculating a length of a short side of the cuboid and a length of a long side of the cuboid by using the coordinates of the cuboid; and determining a position of the first channel of the sound source of the object and a position of the second channel of the sound source of the object based on the length of the short side, the length of the long side, and the first distance.

4. The acoustic signal processing device of claim 3, wherein the determining of the position of the first channel and the position of the second channel comprises:

calculating the second distance between the user and the first channel and the third distance between the user and the second channel, based on the first distance, the length of the short side, and the length of the long side; and determining the position of the first channel and the position of the second channel based on the second distance and the third distance.

5. The acoustic signal processing device of claim 4, wherein the determining of the position of the first channel and the position of the second channel based on the second distance and the third distance comprises:

determining first horizontal coordinates of the first channel and second horizontal coordinates of the second channel based on the second distance and the third distance; and determining first vertical coordinates of the first channel and second vertical coordinates of the second channel based on coordinates of the center of the cuboid.

6. The acoustic signal processing device of claim 5, wherein the plurality of operations further comprises:

determining positions of one or more of other channels of the sound source of the object by using at least one of the first horizontal coordinates, the second horizontal coordinates, the first vertical coordinates, or the second vertical coordinates.

7. The acoustic signal processing device of claim 1, wherein the determining of the position of the sound source of the object comprises:

determining a position of a first channel of the sound source of the object and a position of a second channel of the sound source of the object based on a first field of view (FOV) of a head-mounted display (HMD), the coordinates of the cuboid, and the coordinates of the user.

8. The acoustic signal processing device of claim 7, wherein the determining of the position of the first channel and the position of the second channel comprises:

when the first FOV is greater than a threshold value, obtaining a second FOV which is smaller than the first FOV;

determining first horizontal coordinates of the first channel and second horizontal coordinates of the second channel based on the second FOV, the coordinates of the cuboid, and the coordinates of the user; and determining first vertical coordinates of the first channel and second vertical coordinates of the second channel based on coordinates of a center of the cuboid.

9. A method of operating an acoustic signal processing device, the method comprising:

transforming an object provided as a spatially extended sound source into a cuboid in a virtual reality (VR) space;

obtaining coordinates of the cuboid;

determining a position of a sound source of the object based on the coordinates of the cuboid and coordinates of a user in the VR space; and outputting sound of the spatially extended sound source based on the position of the sound source of the object, wherein the determining the position of the sound source of the object comprises the determining the position of the sound source of the object based on a first distance between a center of the cuboid and the user, a second distance between the user and a first channel of the sound source, and a third distance between the user and a second channel of the sound source, wherein the second distance and the third distance are calculated based on the first distance, a radius, and an angle, and wherein the radius is a radius of a circle associated with the cuboid, wherein the radius is a length of a side of a cross-section of the cuboid perpendicular to y-axis, and equal to half of a length of a short side among the sides of the cross-section or equal to half of a length of a long side among the sides of the cross-section, and wherein the angle is an arctangent of the half of a length of a short side among the sides of the cross-section divided by half of a length of a long side among the sides of the cross-section.

10. The method of claim 9, wherein the transforming of the object comprises:

obtaining a first maximum value and a first minimum value among x-coordinates of the object;

obtaining a second maximum value and a second minimum value among y-coordinates of the object;

obtaining a third maximum value and a third minimum value among z-coordinates of the object; and forming the cuboid by using the first maximum value, the first minimum value, the second maximum value, the second minimum value, the third maximum value, and the third minimum value.

11. The method of claim 9, wherein the determining of the position of the sound source of the object based on the first distance comprises:

calculating a length of a short side of the cuboid and a length of a long side of the cuboid by using the coordinates of the cuboid; and determining a position of the first channel of the sound source of the object and a position of the second channel of the sound source of the object based on the length of the short side, the length of the long side, and the first distance.

12. The method of claim 11, wherein the determining of the position of the first channel and the position of the second channel comprises:

calculating the second distance between the user and the first channel and the third distance between the user and the second channel, based on the first distance, the length of the short side, and the length of the long side; and determining the position of the first channel and the position of the second channel based on the second distance and the third distance.

13. The method of claim 12, wherein the determining of the position of the first channel and the position of the second channel based on the second distance and the third distance comprises:

determining first horizontal coordinates of the first channel and second horizontal coordinates of the second channel based on the second distance and the third distance; and determining first vertical coordinates of the first channel and second vertical coordinates of the second channel based on coordinates of the center of the cuboid.

14. The method of claim 13, further comprising:

determining positions of one or more of other channels of the sound source of the object by using at least one of the first horizontal coordinates, the second horizontal coordinates, the first vertical coordinates, or the second vertical coordinates.

15. The method of claim 9, wherein the determining of the position of the sound source of the object comprises:

determining a position of a first channel of the sound source of the object and a position of a second channel of the sound source of the object based on a first field of view (FOV) of a head-mounted display (HMD), the coordinates of the cuboid, and the coordinates of the user.

16. The method of claim 15, wherein the determining of the position of the first channel and the position of the second channel comprises:

when the first FOV is greater than a threshold value, obtaining a second FOV which is smaller than the first FOV;

determining first horizontal coordinates of the first channel and second horizontal coordinates of the second channel based on the second FOV, the coordinates of the cuboid, and the coordinates of the user; and determining first vertical coordinates of the first channel and second vertical coordinates of the second channel based on coordinates of a center of the cuboid.

* * * * *